Feb. 26, 1935. F. TOEWE Re. 19,481

SELF STARTING SYNCHRONIZED MOTOR DRIVE MEANS FOR CLOCKS

Original Filed Aug. 2, 1929

INVENTOR
Fritz Toewe,
BY
Harold D. Penney, ATTORNEY

Reissued Feb. 26, 1935 Re. 19,481

UNITED STATES PATENT OFFICE 19,481

SELF STARTING SYNCHRONIZED MOTOR DRIVE MEANS FOR CLOCKS

Fritz Toewe, Villingen, Germany, assignor, by mesne assignments, to Kienzle Taxameter und Apparate A. G. Villingen, Germany, a corporation of Germany Original No. 1,788,812, dated January 13, 1931, Serial No. 382,882, August 2, 1929. Application for reissue May 2, 1931, Serial No. 534,682. In Germany December 9, 1928

29 Claims. (Cl. 172—278)

This invention relates to improvements in a synchronous motor for driving clocks and the like, and it consists in the novel features, which are hereinafter described.

One of the objects of my invention is to make a synchronous motor self starting.

Another object of my invention is to produce a more perfect synchronous motor than is at present in use.

A further object of my invention is to facilitate the starting and the synchronization or falling into step of the component parts of my motor.

A still other object of my invention is to have my improved synchronous motor simple, durable and inexpensive.

Other objects and advantages will hereinafter appear.

I attain these objects in one embodiment of my invention by employing a rapidly revolving Ferraris rotating field, from which is branched off a multi-polar alternating field for a synchronous motor of slower rotary speed.

In order to facilitate the starting and falling into step of the synchronous rotor when operating together with the asynchronous rotor, both rotors are coupled by means of a flexible connection.

The details of the above form of my invention are illustrated in the accompanying drawing; and the objects of my invention may also be attained by any mechanical equivalent or obvious modification of the same.

In the drawing.

Like numerals refer to like parts throughout the two views.

Figure 1:
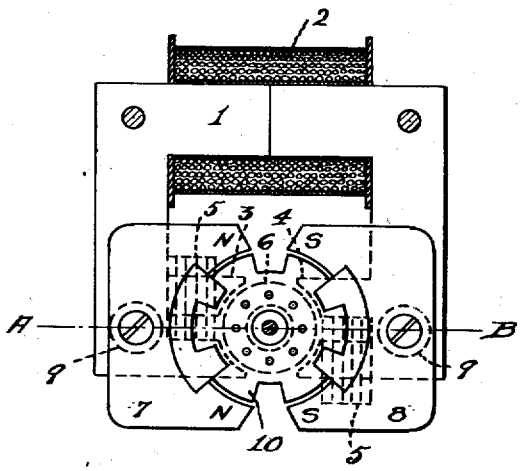
Fig. 1 is a front elevation of my synchronous motor.
Figure 2:
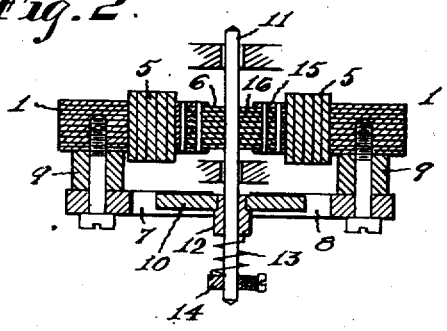
Fig. 2 is a section on the line A—B of Fig. 1.

1 designates the stator and 2 the exciter winding, which together constitute the field of my synchronous motor.

The pole pieces 3 and 4 are split and each half is provided with a shielding coil 5, thereby producing a Ferraris rotating field with one pair of poles. A short-circuit rotor 6, of a construction known to the prior art and consisting of a copper cage 15 with laminated soft-iron core 16, is movably disposed in this rotating field.

To each of the two legs of the stator 1 is secured a pole piece 7, 8 with intermediate supports 9, 9 made of magnetically conducting material with the result that a rotating field for the synchronous rotor 10, made of magnetic steel, is produced between the poles of the pole pieces 7 and 8 as an auxiliary field for the synchronous motor. In the example shown, the alternating field of the synchronous motor is divided for a 6-pole rotor; however, on both sides of the vertical plane of symmetry one pole of each is eliminated; so that there exist on each side two poles only of the same sign, N, N or S, S. Hence, these poles are disposed in the correct pole distribution of a 6-pole field.

The synchronous rotor 10 is rotatably disposed on the axle 11 of the asynchronous rotor 6 by means of a bearing box 12 and is coupled with the asynchronous rotor 6 by means of a helical spring 13, which is attached on the one side to a bearing box 12 and, on the other side, to an adjusting collar 14, which is clamped onto shaft 11.

It is evident that the Ferraris rotating field with the one pair of poles 3 and 4 revolves more rapidly than the 6-pole synchronous rotor 10. The flexible coupling between the two rotors 6 and 10 serves to allow the asynchronous rotor 6, whose starting torsional moment, in case of a rigid connection with the synchronous rotor 10, would not be sufficient to force the latter out of its rest position, to accumulate first enough force, with a simultaneous imparting of a tension to spring 13, to force the synchronous rotor out of its position of rest and keep it moving. Inasmuch as the asynchronous rotor 6, for instance when operating with a. c. of 50 periods, has the tendency to reach a rotary speed of 3000 R. P. M., it rapidly imparts to the synchronous rotor 10, whose synchronous rotary speed is 1000, this number of revolutions. As soon as the synchronous rotor has fallen in step, it takes the lead with respect to the asynchronous motor; from this moment on, the spring 13 acts in the opposite direction upon the asynchronous armature in the manner that the latter is forced to maintain the rotary speed of the synchronous motor.

If a decrease of the rotary speed of the synchronous rotor is not desired, the alternating field of the synchronous motor, and, accordingly, of its rotor, may, of course, be provided with one pair of poles only.

Variations are possible, and parts of my invention may be used without other parts.

I do not, therefore, restrict myself to the details as shown in the drawing but I intend to include also all mechanical equivalents and obvious modifications of the same within the scope of my invention.

What I claim as new is:

1. In a self starting synchronous motor for driving clocks and the like, in combination, an asynchronous rotor having a rapidly revoluble Ferraris rotating field, and a synchronous rotor having a multi-polar alternating field branched off from said Ferraris rotating field; said rotors being interconnected by flexible means.

2. In a self starting synchronous motor for driving clocks and the like, in combination, an asynchronous rotor having a rapidly revoluble Ferraris rotating field, and a synchronous motor of slower rotational speed having a multi-polar alternating field branched off from said Ferraris rotating field, the shafts of said rotors being yieldingly coupled.

3. In a self starting synchronous motor for driving clocks and the like, in combination, an asynchronous rotor having a high speed Ferraris rotating field, a magnetic steel synchronous rotor having an alternating field, said alternating field including opposite pole pieces, said pole pieces being connected magnetically with the stator of said Ferraris rotating field, and a yielding coupling between the supports of said rotors.

4. A device of the class described, an asynchronous rotor having a high speed Ferraris rotating field, a synchronous rotor of magnetic material, pole pieces arranged at opposite sides of said rotor, said pole pieces being magnetically connected to the stator of said Ferraris field and yielding means for coupling the supports of said rotors.

5. In combination, a magnet having exciting means and pole pieces producing a rotary field and an alternating field; a single winding exciting said pole pieces; rotors influenced to rotate by said fields respectively; and means whereby the rotor in the rotating field starts the other rotor.

6. In combination, a magnet having exciting means and pole pieces producing a rotary field and an alternating field; rotors influenced to rotate by said fields respectively; and means whereby the rotor in the rotating field starts the other rotor.

7. In combination, a magnet producing an alternating field free of rotating field; a rotor influenced to rotate in and by said field; and means influenced by flux of said magnet exterior to said magnet to start the rotor.

8. In combination, a magnet having one pair of pole pieces; another pair of pole pieces branched off from said magnet, said magnet having exciting means cooperating with said pairs for producing rotary and alternating fields respectively; rotors influenced to rotate by said fields respectively; and a driving connection between the rotors.

9. In combination, a magnet having one pair of pole pieces; another pair of pole pieces branched off from said magnet, said magnet having exciting means cooperating with said pairs for producing rotary and alternating fields respectively; and rotors influenced to rotate by said fields respectively.

10. In combination, a magnet having exciting means and pole pieces producing an alternating field free of rotating field; a rotor in and rotated by said field; and means cooperating with and moved by said magnet exterior to said magnet for starting said rotor.

11. In combination, an exciting means; a magnet excited thereby having two sets of pole pieces, one set producing a rotary field, the other set producing an alternating field; rotors in and rotated by said fields respectively; and connecting means whereby rotation of one rotor causes rotation of the other.

12. In combination, a magnet having two sets of pole pieces thereon; rotors associated with said sets respectively; exciting means for said magnet; said sets, rotors and exciting means being formed to cause one rotor to act as one type of rotor and the other to act as another type of rotor.

13. In combination, a magnet having pole pieces thereon; rotors associated with different pole pieces respectively; exciting means for said magnet; said pieces, rotors and exciting means being formed to cause one rotor to act as a synchronous rotor and the other as an asynchronous rotor; and means whereby the synchronous rotor is started by the other.

14. In combination, a magnet having two sets of pole pieces thereon; rotors associated with said sets respectively; exciting means for said magnet; said sets, rotors and exciting means being formed to cause one rotor to act as a synchronous rotor and the other as an asynchronous rotor; and means whereby the synchronous rotor is started by the other.

15. In combination, a stator having exciting windings thereon; two sets of pole pieces on said stator, one set producing a rotary field, the other set producing an alternating field; the same winding exciting both fields; a rotor in the rotary field and influenced to rotate thereby; and a synchronous rotor in the alternating field and influenced to rotate thereby and rotatable by said first named rotor.

16. In combination, a stator having exciting windings thereon; two sets of pole pieces on said stator, one set producing a rotary field, the other set producing an alternating field; the same winding exciting both fields; an induction rotor in the rotary field; and a geometrically polar rotor in the alternating field and constrained to rotate with the first named rotor.

17. In combination, a magnet having exciting means and unshaded pole pieces producing a pure alternating field free of rotating field; a rotor in and rotated by said alternating field in synchronism therewith; and means exterior to said alternating field and including a part of said magnet and operated by said magnet when energized for starting said rotor.

18. In combination, a magnet and exciting means therefor producing an alternating field; a rotor influenced to rotate in and by said field; and means influenced by the flux of said magnet exterior to said magnet and said alternating field to start the rotor.

19. In a self-starting synchronous motor including a movable member associated with the field coil of said motor and movable by the magnetic field when the coil is energized, a rotor synchronously operable by the magnetic field of said coil, and means cooperating with said movable member to start said rotor at a speed greater than synchronism when said member is moved.

20. In combination, a magnet having alternating current exciting means and pole pieces producing an alternating field normally free of rotating field; a rotor comprising a part rotated by said alternating field in synchronism therewith; and means including a part of said magnet, and excited by said exciting means and adapted on starting to produce a rotary field to influence a part of the rotor to cause the whole rotor to start.

21. In combination, a magnet having alternating current exciting means and pole pieces producing an alternating field normally free of rotating field; a rotor rotated by said alternating field in synchronism therewith; and means including a part of said magnet, and excited by said exciting means and adapted on starting to produce a rotary field to cause the rotor to start.

22. In combination, a magnet having alternating current exciting means and pole pieces producing an alternating field normally free of rotating field; a rotor normally rotated by said alternating field; and means including a part of said magnet, and excited by said exciting means and adapted on starting to produce a rotary field to cause the rotor to start.

23. In combination, a magnet having alternating current exciting means and pole pieces producing an alternating field normally free of rotating field; a rotor normally rotated by said alternating field; and means including a part of said magnet, and excited by said exciting means and adapted on starting to start said rotor.

24. In a self-starting synchronous motor including a movable means associated with the field coil of said motor and operable by the magnetic field when the coil is energized, a rotor synchronously operable by the magnetic field of said coil, and means cooperating with said movable means to start said rotor at a speed greater than synchronism when said movable means is operated.

25. In a self-starting synchronous motor including a movable member associated with the field coil of said motor and rotated by the magnetic field when the coil is energized, a rotor member synchronously operable by the magnetic field of said coil, and means cooperating with said movable member to start said rotor member at a speed greater than synchronism when said movable member is moved.

26. In a self-starting synchronous motor including means associated with the field coil of said motor to provide a rotary field and an alternating field, a movable member movable by the rotary field when the coil is energized, a rotor synchronously operable by the alternating field, and means cooperating with said movable member to start said rotor at a speed greater than synchronism when said member is moved by the rotary field.

27. In combination, a single magnet having exciting means and pole pieces producing a non-rotary alternating field between said pole pieces; a rotor in and rotated by said field between said pole pieces; and means cooperating with, and moved by, said single magnet exterior to the space between said pole pieces for starting said rotor.

28. In combination, a single magnet having exciting means and pole pieces producing a non-rotary alternating field free of rotating field; a rotor in and rotated by said non-rotary field; and means cooperating with, and moved by, said magnet exterior to said magnet and said non-rotary field for starting said rotor.

29. In combination, a single magnet having exciting means and pole pieces producing an alternating field free of rotating field; a rotor in and rotated by said field; and means for starting said rotor, influenced by a part of the flux of said magnet exterior to the space adjacent to said rotor.

FRITZ TOEWE.